(12) United States Patent
Ekbom

(10) Patent No.: US 11,100,136 B2
(45) Date of Patent: Aug. 24, 2021

(54) SYNCHRONIZATION OF DATABASES COMPRISING SPATIAL ENTITY ATTRIBUTES

(71) Applicant: T2 Data AB, Kista (SE)

(72) Inventor: Mikael Ekbom, Åkersberga (SE)

(73) Assignee: T2 Data AB, Kista (SE)

( * ) Notice: Subject to any disclaimer, the term of this patent is extended or adjusted under 35 U.S.C. 154(b) by 233 days.

(21) Appl. No.: 16/505,475

(22) Filed: Jul. 8, 2019

(65) Prior Publication Data

US 2019/0347275 A1 Nov. 14, 2019

Related U.S. Application Data

(63) Continuation-in-part of application No. 15/779,044, filed as application No. PCT/EP2016/078464 on Nov. 22, 2016, now Pat. No. 10,877,991.

(30) Foreign Application Priority Data

Nov. 24, 2015 (SE) .................................. 1551528-1

(51) Int. Cl.
| | | |
|---|---|---|
| *G06F 16/00* | (2019.01) | |
| *G06F 16/27* | (2019.01) | |
| *G06F 11/10* | (2006.01) | |
| *G06F 16/901* | (2019.01) | |
| *G06K 9/62* | (2006.01) | |

(52) U.S. Cl.
CPC ........ *G06F 16/275* (2019.01); *G06F 11/1004* (2013.01); *G06F 16/9027* (2019.01); *G06K 9/6218* (2013.01)

(58) Field of Classification Search
CPC . G06F 16/275; G06F 16/9027; G06K 9/6218; G06K 9/622
See application file for complete search history.

(56) References Cited

U.S. PATENT DOCUMENTS 6,529,921 B1 3/2003 Berkowitz et al.
7,577,691 B2 8/2009 Novik et al.
(Continued)

OTHER PUBLICATIONS

Menno-Jan Kraak and Alan M. MacEachren, "Visualization of Spatial Data's Temporal Component", Proceedings, Spatial Data Handling Advances in GIS Research, Edinburgh, Scotland, Sep. 5-9, 1994, pp. 1-12. (Year: 1994).*

(Continued)

*Primary Examiner* — Cheryl Lewis
(74) *Attorney, Agent, or Firm* — Davis Wright Tremaine LLP

(57) ABSTRACT

The present disclosure relates to a method for determining a synchronization state between a primary database 250 and one or more secondary databases communicatively coupled with the primary database to form a distributed and nonhierarchical database cluster, wherein the primary and secondary databases store attributes 320 of spatial entities 300 of a space modeled using a spatial model, and each database comprises data entities representing spatial entities 300 with defined spatial boundaries within at least a segment of the spatial model, where the attributes 320 of the spatial entities 300 are coupled to the data entities. The method comprises: generating a snapshot comprising information relating to data entities within a first segment of the spatial model in the primary database at a snapshot time $T_s$, said information identifying changes to the data entities where each change comprises a time stamp 340, wherein only data entities with a time stamp $\leq T_0$, where $T_s > T_0$, are included in the snapshot, although changes to the data entities up to the time $T_s$ have been received and stored in the primary database 250; receiving, from one or more secondary databases in the cluster, corresponding generated snapshots, each snapshot comprising data entities within the same first segment of the spatial model in said secondary database, wherein only data (Continued)

entities with a time stamp $\leq T_0$, where $T_s > T_0$, are included in the snapshot; and determining a synchronization state based on a comparison between the generated and received snapshots, wherein the synchronization state is determined to be not synchronized if the generated snapshot and the received corresponding snapshots do not all match.

17 Claims, 5 Drawing Sheets

(56) References Cited

U.S. PATENT DOCUMENTS

| | | | |
|---|---|---|---|
| 7,912,633 | B1 | 3/2011 | Dietsch et al. |
| 2005/0165858 | A1 | 7/2005 | Tom et al. |
| 2007/0014314 | A1 | 1/2007 | O'Neil |
| 2008/0168183 | A1 | 7/2008 | Marcy et al. |
| 2008/0222212 | A1 | 9/2008 | Prasad et al. |
| 2013/0138615 | A1 | 5/2013 | Gupta et al. |
| 2013/0304700 | A1 | 11/2013 | Nicklin |

OTHER PUBLICATIONS

Mi-Young Choi, Eun-Ae Cho, Dae-Ha Park, Chank-Joo Moon, and Doo-Kwon Baik, "A Database Synchronization Algorithm for Mobile Devices", IEEE Transactions on Consumer Electronics, vol. 56, No. 2, May 2010, pp. 392-398. (Year: 2010).*

Du et al., "Clock-SI: Snapshot Isolation for Partitioned Data Stores Using Loosely Synchronized Clocks," IEEE 32nd International Symposium on Reliable Distributed Systems, Sep. 30, 2013, pp. 173-184.

Extended European Search Report dated Nov. 20, 2019, Patent Application No. 19196137.4, 10 pages.

Guo et al., "An Effective Tile Caching Mechanism of UAV Remote Sensing Map Based on Hilbert Coding Index," 2019 IEEE 11th International Conference on Communication Software and Networks (ICCSN), Jun. 12, 2019, 7 pages.

International Search Report and Written Opinion dated Mar. 7, 2017, in International Patent Application No. PCT/EP2016/078464, filed Nov. 22, 2016, 11 pages.

International Search Report dated Aug. 25, 2020, in International Patent Application No. PCT/EP2020/066105, fled Jun. 10, 2020, 5 pages.

Poorazizi et al., "Developing a Mobile GIS for Field Geospatial Data Acquisition," WSEAS International Conference on Urban Planning and Transportation (UPT '07), Jul. 22, 2018, 5 pages.

Written Opinion of the International Searching Authority dated Aug. 25, 2020, in International Patent Application No. PCT/EP2020/066105, filed Jun. 10, 2020, 6 pages.

Zhao et al., "Synchronization of Dynamical Networks With Nonidentical Nodes: Criteria and Control," IEEE Transactions on Circuits and Systems-I: Regular Papers, 58(3):584-594, Mar. 2011.

* cited by examiner

SYNCHRONIZATION OF DATABASES COMPRISING SPATIAL ENTITY ATTRIBUTES

CROSS-REFERENCE TO RELATED APPLICATIONS

This application is a continuation-in-part of U.S. application Ser. No. 15/779,044 filed May 24, 2018, now U.S. Pat. No. 10,877,991, entitled "DATA SYNCHRONIZATION IN A DISTRIBUTED DATA STORAGE SYSTEM" which is a U.S. National Phase ("371") application claiming benefit of PCT/EP2016/078464, filed Nov. 22, 2016, entitled "DATA SYNCHRONIZATION IN A DISTRIBUTED DATA STORAGE SYSTEM" which claims benefit of Swedish Application No. 1551528-1 filed Nov. 24, 2015, entitled "DATA SYNCHRONIZATION IN A DISTRIBUTED DATA STORAGE SYSTEM" the contents of which are incorporated by reference herein in their entirety. This application further incorporates by reference the full disclosure of Swedish Application No. 1551528-1, filed concurrently herewith, entitled "CREATION OF A DECISION SUPPORT MATERIAL INDICATING DAMAGE TO AN ANATOMICAL JOINT", the content of which is incorporated by reference herein in its entirety.

TECHNICAL FIELD

The present disclosure relates to synchronization of databases comprising spatial entity attributes.

BACKGROUND

It is in many different situations useful to be able to store attributes that relate to different locations in a space. Meteorological data can e.g. be collected for different spatial locations in the atmosphere and used for forecasting the weather. The meteorological data can be stored and updated for each spatial location in the atmosphere. Another example is air traffic control, where the position of all aircraft in the controlled airspace needs to be continuously monitored.

PROBLEMS WITH THE PRIOR ART

In most situations where attributes that relate to different locations in a space are stored, the attributes for the different spatial locations can be stored in a database on a central server that is accessible to all parties to the system.

However, in some applications, it is useful to distribute the storage into several different databases. For example, if a cluster of drones co-operate to gather information such as e.g. land surveying information, it is useful if each of the drones can maintain a database about the attributes of the spatial locations surveyed by this drone, and the drones in the cluster can exchange such information between them. This helps ensuring that the drones in the cluster together cover all spatial locations, and avoids any of the drones in the cluster unnecessarily surveying a spatial location that has already been surveyed by another drone in the cluster. In such situations, it is a challenge to keep the databases synchronized, i.e. having the same attributes stored for each spatial location in the different drones. There is often not a need to synchronize the attributes for all of the spatial locations in all of the drones.

Synchronization could be effected in the regular way, by all drones in the cluster communicating with a central server that maintains the "master" version of the database. However, this means that the drones in the cluster cannot co-operate with each other if they do not have contact with the central server.

There is thus a need for a non-hierarchical way of synchronizing databases comprising spatial entity attributes.

SUMMARY

The present disclosure aims to provide a method of synchronizing clustered databases comprising spatial entity attributes that are maintained at different locations. This is achieved by methods, databases, computer-readable mediums and computer program products as defined in the claims.

The present disclosure relates to methods for determining a synchronization state between a primary database and one or more secondary databases communicatively coupled with the primary database to form a distributed and nonhierarchical database cluster, wherein the primary and secondary databases store attributes of spatial entities of a space modeled using a spatial model, and each database comprises data entities representing spatial entities with defined spatial boundaries within at least a segment of the spatial model, where the attributes of the spatial entities are coupled to the data entities. The claimed method may comprise: generating a snapshot comprising information relating to data entities within a first segment of the spatial model in the primary database at a snapshot time $T_s$, said information identifying changes to the data entities where each change comprises a time stamp, wherein only data entities with a time stamp $\leq T_0$, where $T_s > T_0$, are included in the snapshot, although changes to the data entities up to the time $T_s$ have been received and stored in the primary database; receiving, from one or more secondary databases in the cluster, corresponding generated snapshots, each snapshot comprising data entities within the same first segment of the spatial model in the secondary database, wherein only data entities with a time stamp $\leq T_0$, where $T_s > T_0$, are included in the snapshot; and determining a synchronization state based on a comparison between the generated and received snapshots, wherein the synchronization state is determined to be not synchronized if the generated snapshot and the received corresponding snapshots do not all match.

In embodiments, the snapshot time $T_s$ is selected to be at least a delay time $T_d$ after $T_0$, i.e. $T_s \geq T_0 + T_d$.

In embodiments, the delay time $T_d$ is set to be longer than the maximum transmission delay time between the databases in the cluster. In embodiments, changes to the data entities during the delay time $T_d$ do not affect the snapshot because they are stored in a cache memory at least during the delay time $T_d$ before being added to respective database. Other ways of ensuring that changes to the data entities during the delay time $T_d$ do not affect the snapshot are of course also possible.

In embodiments, $T_0$ is determined in such a way that it for the selected snapshot time $T_s$ represents a corresponding time in all databases.

In embodiments, the first segment of the spatial model is selected based on the spatial entity position (SEP) of the data entity having the most recent time stamp. In the example where the method is used for synchronizing e.g. two drones working side-by-side surveying adjacent spatial locations, the most important segment to synchronize is often the segment of the spatial model currently being surveyed by both drones, i.e. the most recently surveyed spatial entity. This spatial entity would normally be represented by the data entity having the most recent time stamp, since attributes are normally stored or updated for the data entities when the spatial entities are surveyed. If the segment of the spatial model is selected to include the data entity having the most recent time stamp, the segment will thus include the data entity representing the most recently surveyed spatial entity.

In embodiments, the secondary databases from which to receive snapshots are selected based on the selected first segment of the spatial model. The size of the segment may be selected e.g. based on the transmission conditions, in order to reduce the amount of data needed to be transferred if the transmission conditions are bad. The segment may be selected to be the whole spatial model, but it is generally more practical to select a limited area or volume.

The number of other databases to exchange snapshots with may also be selected, based e.g. on the size of the segment selected and/or the nature of the attributes. If a very small segment is selected, it may not be interesting to synchronize this segment with all the other databases in the cluster. Also, if the attributes are fast-changing, attributes stored a long time ago in other databases may be less interesting to synchronize. The other databases to exchange snapshots with may however be determined simply based on which other databases are within communicating range. There is often not a need to synchronize all of the data entities in all of the databases in the cluster. The determination of synchronization state may therefore be based on the need for synchronization. In embodiments, the snapshot is generated based on there being determined to be a need to synchronize the primary database with at least one secondary database, e.g. based on the proximity between two database arrangements.

In embodiments, a data entity is not created until an attribute has been determined for the spatial entity represented by this data entity. This means that there will be no data entities without attributes in the databases, which means that at start there are no data entities at all in the databases. This may be useful especially if there are large numbers of spatial entities, e.g. due to the resolution being high or the area or volume of the spatial model being large. If the spatial model e.g. is an octree model of the whole earth, there will in most situations be interesting attributes only for spatial entities within a very small part of this model, e.g. between the earth surface and the atmosphere.

In embodiments, the space is modeled using a hierarchical spatial model, such as e.g. a hierarchical hexagonal model, a hierarchical quadtree model or a hierarchical octree model. A hierarchical model may simplify both determination of synchronization state and actual synchronization of the databases.

In embodiments, the method further comprises obtaining a timeslot configuration, and selecting the data entities to be included in the snapshot based also on this timeslot configuration, so that only data entities having a time stamp falling within a selected timeslot are included in the snapshot. The timeslot configuration may e.g. comprise a first timeslot defined by a time T and a timeslot ΔT.

The timeslot configuration may comprise multiple non-overlapping timeslots, where a snapshot is generated and received for each of the multiple timeslots, and a synchronization state is determined for each of the multiple timeslots.

In embodiments, the synchronization state is determined by calculating a checksum based on the data entities in the snapshot, where the checksum is generated by merging generated and received information. The synchronization state may however also be determined in other ways, such as e.g. calculating a hash-sum or using an algorithm which calculates a smaller portion of data representing a unique identity of the data entities.

In embodiments, the method further comprises synchronizing the data entities in the primary database with the data entities in the at least one secondary database if the synchronization state is determined to be not synchronized. The synchronization may e.g. comprise identifying missing or changed data entities and redistributing them among the databases. The data entities may be synchronized in such a way that for all non-deleted data entities, newer versions of the data entities always replace older. The data entities may further be synchronized in such a way that deleted data entities always replace none-deleted, even if they are older.

In embodiments, a simulated synchronized state is maintained during the synchronization. The simulated synchronized state may e.g. be determined by each database sending a missing/changed data entities list and receiving generated missing/changed data entities lists from other databases in the cluster. A database that is missing data entities or changes to them may in this way have enough information about what it is missing to be capable of creating a correct snapshot.

The present disclosure also relates to a primary database arrangement in a distributed and nonhierarchical cluster of communicatively coupled database arrangements, the primary database arrangement comprising a primary database storing attributes of spatial entities of a space modeled using a spatial model, and comprising data entities representing spatial entities with defined spatial boundaries within at least a segment of the spatial model, where the attributes of the spatial entities are coupled to the data entities. The primary database arrangement may further comprise: at least one processor configured to perform any of the above disclosed methods; a storage means configured to store the data entities and their attributes; and a communications interface configured to send/receive attributes related to the data entities to/from the processor to/from one or more secondary database arrangements in the cluster.

The present disclosure also relates to a computer-readable medium on which is stored non-transitory information configured to control a processor to perform any of the above disclosed methods.

The present disclosure also relates to a computer program product comprising code portions adapted to control a processor to perform any of the above disclosed methods.

In this disclosure, the term "segment" defines an area or volume of the spatial model. The segment may e.g. be defined as a certain number of spatial entities, since each spatial entity corresponds to a certain area or volume in the spatial model. If the spatial model is a hierarchical spatial model, the segment may be defined as a certain hierarchical level in the hierarchical spatial model, since this also corresponds to an area or volume of the spatial model.

In this disclosure, the term "primary database" defines the database in the database arrangement that initiates the determination of the synchronization state and defines the segment of the spatial model regarding which the determination of synchronization state takes place. The term "secondary database" defines each of the databases in the other database arrangements.

The at least one processor may be one processor, or a number of processors between which signals are transmitted. Some processing may e.g. take place in one processor, and signals may then be transmitted to one or more other processors for further processing.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Introduction

In order to store attributes that relate to different locations in a space, it is advantageous to divide the space into spatial location coordinates which each have a certain spatial extension, where the spatial extension depends on the resolution required for the storage. In some applications, a resolution of e.g. a square or cubic millimeter is required, while for other applications, a much lower resolution of e.g. a square or cubic meter, or even a square or cubic kilometer, is enough.

Figure 1A:
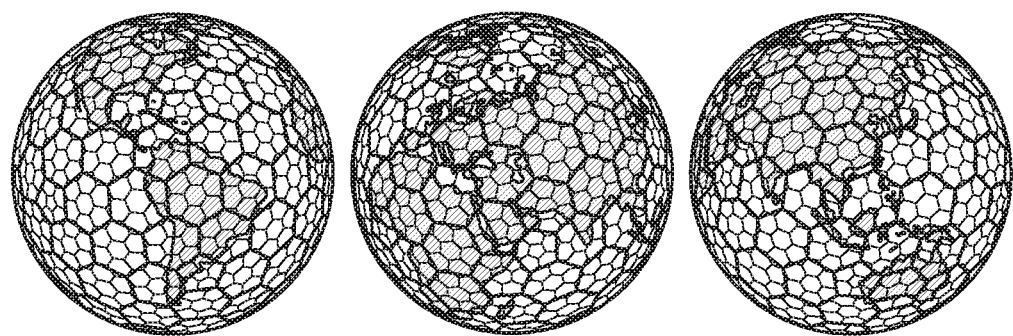
FIGS. 1a-c show examples of spatial models.
Figure 1B:
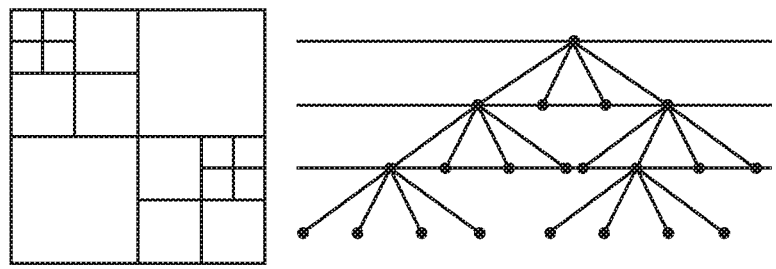
Figure 1C:
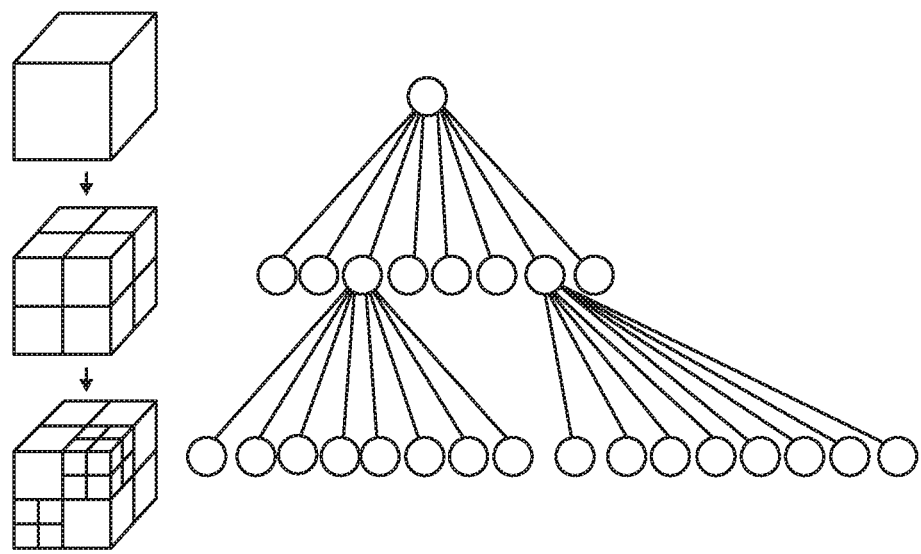

It is possible to model the space using a spatial model, where the smallest part is called a spatial entity. If the space is a two-dimensional (2D) space, the spatial model may e.g. be a hexagon model or a quadtree model. FIG. 1a shows an example of a hexagonal spatial model used for mapping the earth, and FIG. 1b shows an example of a hierarchical quadtree model. If the space is a three-dimensional (3D) space, the spatial model may e.g. be an octree model (octrees are the three-dimensional analog of quadtrees). FIG. 1c shows an example of a hierarchical octree model. Octrees are often used in 3D graphics and 3D game engines. Hexagonal spatial models may also be hierarchical in the same way as the illustrated quadtree and octree models, by a number of connected hexagons being grouped into a larger segment that defines the next hierarchical level. There are also three-dimensional hexagonal spatial models.

If the space is modelled using a spatial model, each spatial location becomes a spatial entity, with well-defined boundaries. Each spatial entity can be represented by a data entity in a database. It is then possible to store the attributes of the spatial entity as attributes of this data entity.

The spatial entities may be grouped into segments, where each segment defines an area or volume of the spatial model. The segment may e.g. be defined as a certain number of spatial entities, since each spatial entity corresponds to a certain area or volume in the spatial model. If the spatial model is a hierarchical spatial model, the segment may be defined as a certain hierarchical level in the hierarchical spatial model, since this also corresponds to an area or volume of the spatial model.

If a space to be land surveyed by a cluster of drones is modelled using a spatial model, the attributes of each spatial entity may be stored as attributes of the data entity representing the spatial entity in a database in each drone. The drones in the cluster can then each maintain a database of the attributes of the spatial locations surveyed by this drone as attributes of the data entities representing the spatial entities. However, in order for the drones in the cluster to be able to co-operate with each other at all times, a non-hierarchical way of synchronizing these databases is needed.

The inventor has realized that the general method described in US 2018/0341691 may be used for determining a synchronization state between the databases in the drones, if each spatial database is considered to correspond to a node in the distributed data storage system described in US 2018/0341691 (which describes data synchronization in a distributed data storage system and is hereby incorporated by reference). This helps ensuring that the drones in the cluster cover all spatial locations, and avoiding that the same location is surveyed twice.

The solution involves detecting if databases storing attributes of spatial entities of a space modeled using a spatial model, where each database comprises data entities representing spatial entities with defined spatial boundaries within at least a segment of the spatial model, are synchronized or not. The databases are preferably communicatively coupled to form a distributed and nonhierarchical database cluster.

The segment may be selected to be the whole spatial model, but it is generally more practical to select a limited area or volume. The size of the segment may be selected e.g. based on the transmission conditions, in order to reduce the amount of data needed to be transferred if the transmission conditions are bad. There is often not a need to synchronize all of the data entities in all of the databases in the cluster. For example, if a very small segment is selected, it may not be interesting to synchronize this segment with all the other databases in the cluster.

In order to differentiate the databases from each other, the database in the database arrangement that initiates the determination of the synchronization state may be defined as a "primary database", and the databases from which snapshots are received may be defined as "secondary databases".

If a snapshot is generated and transmitted simultaneously from all databases in the cluster, information relating to a change to a data entity may have already been received in one database in the cluster but is still not received in another database in the cluster due to variations in communication network transmission delay. The snapshots will then indicate that the data entities within the same segment of the spatial model in the databases are not synchronized, although they will be shortly after. It is therefore desirable to eliminate or at least reduce the influence of varying transmission delay on the step of generating a snapshot.

The present disclosure overcomes this problem by providing each change to a data entity with a time stamp, and determining a synchronization state based on snapshots where only data entities with a time stamp $\leq T_0$, where $T_s > T_0$, are included, although changes to the data entities up to the time $T_s$ have been received and stored in the databases, and thus discloses a method for detection of a synchronization state and optionally an improved continuous synchronization of data between distributed and nonhierarchical spatial databases in a cluster that is flexible and resilient to faults.

The invention may be used for any database arrangements storing attributes of spatial entities of a space modeled using a spatial model, where the database arrangements are communicatively coupled to form a distributed and nonhierarchical database cluster, e.g. database arrangements arranged in a cluster of drones that co-operate to gather land surveying information. It may be difficult to keep the data entities synchronized in the drone databases, i.e. having the same version of data entities in different databases in the cluster. In a non-limiting example, surveying drones may lose wireless network coverage during a period and during this period survey spatial locations that other drones are unaware of. In this example, the data entities in the database of one drone would indicate that the spatial location has been surveyed whereas the data entities in the databases of other drones in the cluster would indicate that the spatial location has not been surveyed, thus the synchronization state may be said to be "not synchronized". It may be difficult to detect that databases in the cluster have versions of the data entities that differ, e.g. to determine a synchronization state as "synchronized" or "not synchronized".

Another situation where the invention may be used is for vehicles such as e.g. cars that exchange information about the road conditions in the form of spatial entity attributes. It is common nowadays for cars to report road condition data to the cloud, and receive aggregated road condition data from the cloud. However, in situations where there is no connection to the cloud, cars could instead exchange such information directly with other cars. In such situations, there may be a need to determine whether the locally held databases are synchronized for a certain segment of the spatial model. The same may apply to e.g. airplanes or boats, which may exchange information about e.g. weather or navigational warnings in the form of spatial entity attributes. Mobile phones may also have the need to exchange spatial entity attribute information directly between each other, and in this context determine a synchronization state.

System Embodiments

Figure 2:
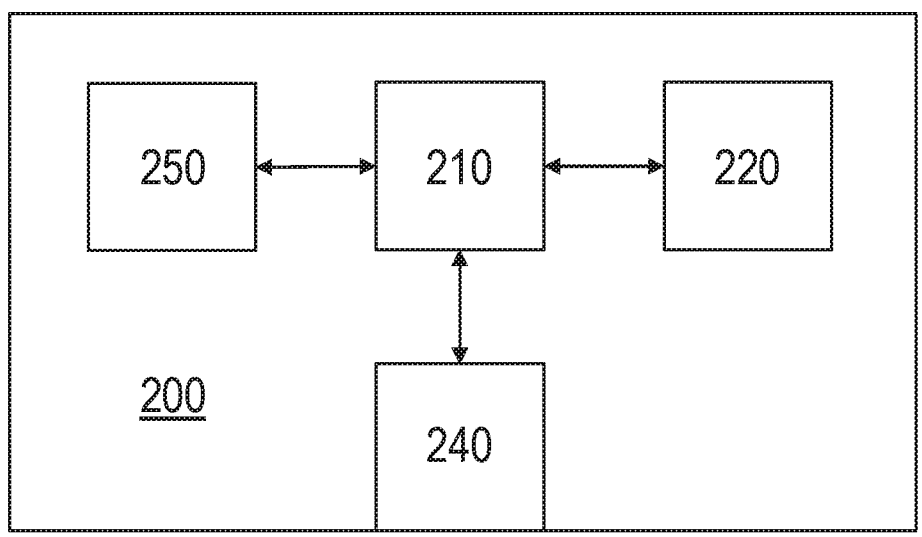
FIG. 2 shows a schematic view of one or more embodiments of a database arrangement, in accordance with one or more embodiments of the disclosure.

FIG. 2 shows a schematic view of an embodiment of a database arrangement 200. The database arrangement 200 may comprise a database 250, at least one processor 210, a storage means 220 in the form of e.g. a memory, and a communications interface 240. The database 250 may store attributes of spatial entities of a space modeled using a spatial model, such as e.g. a hierarchical spatial hexagon model, a hierarchical spatial quadtree model, or a hierarchical spatial octree model. The database 250 may comprise data entities representing spatial entities with defined spatial boundaries within at least a segment of the spatial model, where the attributes of the spatial entities are coupled to the data entities.

The database arrangement 200 may form a part of a distributed and nonhierarchical cluster of communicatively coupled database arrangements 200. The communications interface 240 may be configured to communicate with these other database arrangements 200, in order to send and receive attributes related to the data entities to and from the processor 210 to and from one or more other database arrangements 200 in the cluster.

The at least one processor 210 may be provided with specifically designed programming or program code portions adapted to control the at least one processor 210 to perform the steps and functions of one or more embodiments of the methods described herein. The storage means 220 may be adapted to store data entities and their attributes received from the at least one processor 210, and the at least one processor 210 may be adapted to retrieve such stored data entities and their attributes from the storage means 220.

The at least one processor 210 may be arranged to generate a snapshot comprising information relating to data entities within a first segment of the spatial model in the database 250 at a snapshot time $T_s$, said information identifying changes to the data entities where each change comprises a time stamp, wherein only data entities with a time stamp $\leq T_0$, where $T_s > T_0$, are included in the snapshot, although changes to the data entities up to the time $T_s$ have been received and stored in the database 250.

The at least one processor 210 may further be arranged to receive, from one or more other database arrangements 200 in the cluster, corresponding generated snapshots, each snapshot comprising data entities within the same first segment of the spatial model in the database of the respective database arrangement 200, wherein only data entities with a time stamp $\leq T_0$, where $T_s > T_0$, are included in the snapshot.

The size of the segment may be selected e.g. based on the transmission conditions, in order to reduce the amount of data needed to be transferred if the transmission conditions are bad. The segment may be selected to be the whole spatial model, but it is generally more practical to select a limited area or volume.

The number of other databases to exchange snapshots with may also be selected, based e.g. on the size of the segment selected and/or the nature of the attributes. The databases from which to receive snapshots may e.g. selected based on the selected first segment of the spatial model. If a very small segment is selected, it may not be interesting to synchronize this segment with all the other databases in the cluster. Also, if the attributes are fast-changing, attributes stored a long time ago in other databases may be less interesting to synchronize. The other databases to exchange snapshots with may however be determined simply based on which other database arrangements are within communicating range. There is often not a need to synchronize all of the data entities in all of the databases in the cluster. The determination of synchronization state may therefore be based on the need for synchronization. In embodiments, the snapshot is generated based on there being determined to be a need to synchronize the database 250 with at least one other database, e.g. based on the proximity between two database arrangements 200.

The snapshots comprise all changes to the data entities in the selected segment since the previous snapshot was generated but only up to the time $T_0$. $T_0$ is preferably set in a controlled way, so that it is ensured that all databases have the same reference point, e.g. by determining $T_0$ in such a way that it for the selected snapshot time $T_s$ represents a corresponding time in all databases.

The at least one processor 210 may further be arranged to determine a synchronization state based on a comparison between the generated and received snapshots, and determining the synchronization state to be not synchronized if the generated snapshot and the received corresponding snapshots do not all match. If they all match, the synchronization state is instead determined to be synchronized.

The snapshot time $T_s$ may be at least a delay time $T_d$ after $T_0$, i.e. $T_s \geq T_0 + T_d$. The delay time $T_d$ is preferably set to be longer than the maximum transmission delay time between the database arrangements 200 in the cluster. The maximum transmission delay time may e.g. depend on the bandwidth of the wireless transmission between the database arrangements 200. The transmission delay may e.g. be determined or estimated as end-to-end delay time, round-trip delay time (RTD) or round-trip time (RTT). In embodiments, the transmission delay may be determined or estimated based on a communication network model.

Since the data entities are selected based on their time stamps, only recent changes (up to the time $T_0$) are considered, although changes to the data entities up to the time $T_s$ have been stored in the databases.

By generating a snapshot based on data entities with a time stamp $\leq T_0$, the influence on the generated snapshot of varying transmission delay time between databases in the cluster may be reduced, thus improving synchronization of distributed databases in a cluster. The delay time $T_d$ may e.g. calculated based on a statistical measure such as max, average, or standard deviation of the transmission delay.

One way of determining $T_0$ so that it for a selected snapshot time $T_s$ represents a corresponding time in all databases is to calculate $T_0$ according to the following equation:

$$T_0 = T_s - (T_s \bmod T_d) - T_d$$

This forces $T_0$ into a time slot of the length $T_d$, and ensures that $T_0$ falls into the same time slot in all databases. It is of course also possible to determine $T_0$ in other ways.

One way of ensuring that only data entities with a time stamp $\leq T_0$ are included in the snapshot is to insert data entities into a buffer, and select data entities from the buffer based on the time stamps of the data entities. It is possible to reduce the complexity of the selection of data entities from the buffer by introducing an ordered buffer such that all the selected data entities are in adjacent positions in the buffer. The data entities may e.g. be ordered based on the time stamp of the data entity in ascending or descending order.

Figure 3A:
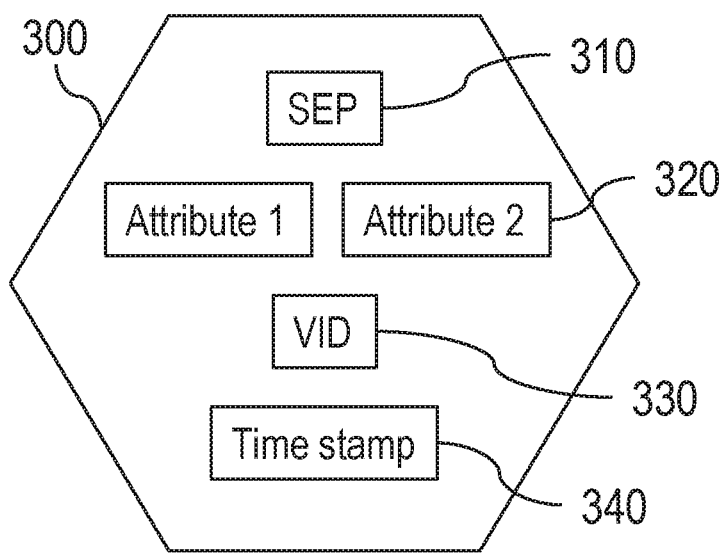
FIGS. 3a-b show schematic examples of spatial entities that may be represented by data entities, in accordance with one or more embodiments of the disclosure.
Figure 3B:
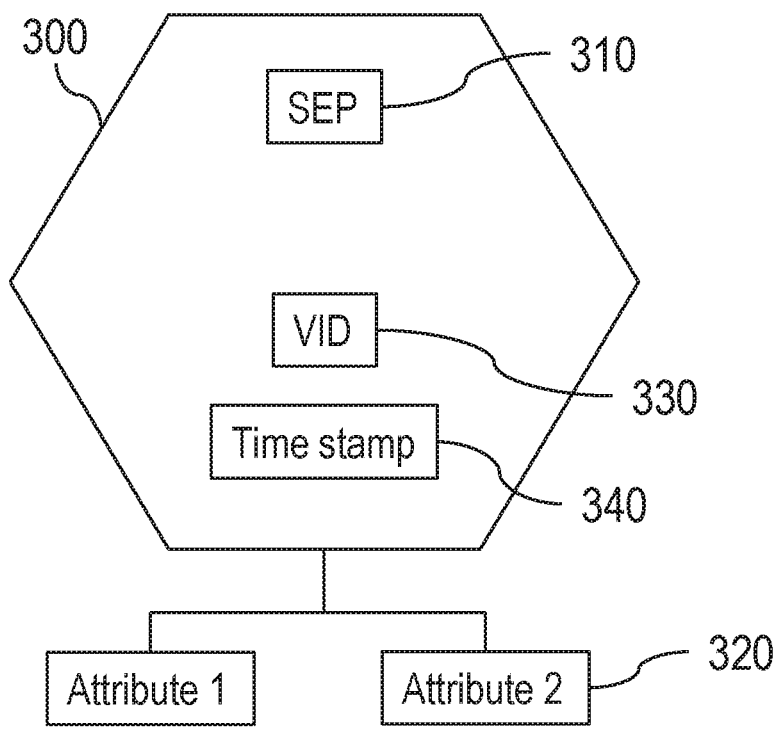

FIGS. 3*a-b* show schematic examples of spatial entities 300 that may be represented by data entities. A spatial entity 300 can be seen as an atomic entity (immutable), or be divided into attribute sets that are immutable entities belonging to the commonly defined spatial entity.

Since each spatial entity 300 has a defined area or volume with defined spatial boundaries, each data entity may comprise a spatial entity position (SEP) 310. The SEP 310 preferably defines the position of the spatial entity within the spatial model, and may be of any data type, e.g. text, integer or floating point number, as would be understood by a skilled person. The SEP 310 may e.g. be the coordinates or address that defines the location of the spatial entity within the spatial model. If the spatial model e.g. is an octree model of the earth with the center of the earth defined as the center of the octree model, the address to the spatial entity within the spatial model may also define the physical position of the spatial entity. However, in other situations, the SEP 310 may be just a data address within the model, and the actual physical position of the spatial entity may be defined elsewhere.

At least one attribute 320 of the spatial entity may also be coupled to each data entity, e.g. by being comprised in the data entity. In embodiments, the at least one attribute 320 may be of any data type, e.g. text, integer or floating point number, as would be understood by a skilled person. The attribute 320 is often more than just a single value. It can be any collection of numbers and/or strings and it can include internal objects, even in several levels. The attribute 320 is thus often a complex data structure. Examples of spatial entity attributes are e.g. elevation, inclination, temperature, humidity, classification of vegetation, detection of different kinds of attacks on vegetation such as e.g. mold or insects, and detection of algae bloom. Spatial entity attributes may also be e.g. different kinds of buildings or edifices.

The data entity preferably comprises a time stamp 340 for each change to an attribute 320 of the data entity. The time stamps 340 do not necessarily represent the actual time—any parameter that indicates the relative time can serve as a time stamp 340. A time stamp 340 may e.g. be in the form h:m:s, such as e.g. 8:28:27.32 or 11:57:22.81, but it may also be e.g. a number representing e.g. the number of milliseconds that have passed since a defined starting point. The databases are preferably synchronized so that time stamps 340 generated at the same time in different databases correspond to each other, using methods per se known to the person skilled in the art.

In embodiments, the data entity may further comprise a version identity (VID) 330 and/or a deleted-flag that indicates that the data entity is created and exists or that the data entity has been deleted but not erased from the memory. The optional VID 330 may e.g. be generated by calculating a hash sum or generating a value of some other kind, as would be understood by the skilled person. There are also a number of other ways of marking a data entity as deleted, e.g. by letting a specific data entity type represent a deleted data entity, and allow this data entity type to exclude its contents, thus making it smaller.

In embodiments, the optional VID 330 is initially set when the data entity is created, and updated each time an attribute 320 is updated. In embodiments, the optional VID 330 uniquely identifies the version of the attribute 320 and is a unique identifier that may be generated by calculating a hash sum or by generating a value of some kind. In a non-limiting example, the optional VID 330 may be represented by 16 bits, 32 bits, 64 bits, 128 bits or any other number of bits or data representation depending on the application, number of databases etc. In yet an example, the optional VID 330 may be randomly generated. In embodiments, the data entity time stamp 340 is set to the time recorded by the database when the data entity is created, updated or deleted. In embodiments, the optional entity deleted-flag is set to FALSE or 0 (zero) when the data entity is created and exists or to TRUE or 1 (one) when the data entity has been deleted but not erased from the memory 220.

The time stamp 340 may indicate when the data entity was created, updated or deleted. The time stamp 340 may e.g. be set or assigned to the data entity when the change to the data entity is made. In embodiments, each time a data entity is created, or deleted, or updated by changing the content, which leads to VID 330 and/or time stamp 340 changes, a changed data entity is generated and distributed to the other databases in the cluster via the communications network.

The example spatial entity 300 shown in FIG. 3*a* is an immutable entity represented by a data entity comprising a SEP 310, two attributes 320, a VID 330 and a time stamp 340.

The example spatial entity 300 shown in FIG. 3*b* is coupled to two attributes 320 that are immutable entities belonging to the commonly defined spatial entity 300. In this case, the time stamp 340 and the optional VID 330 may be comprised either in the data entity (as shown in FIG. 3*b*) or as a time stamp 340 and an optional VID 330 in each of the attributes 320.

In embodiments, the first segment of the spatial model is selected based on the SEP 310 of the data entity having the most recent time stamp 340. In the example where the method is used for synchronizing e.g. two drones working side-by-side surveying adjacent spatial locations, the most important segment to synchronize may be the segment of the spatial model currently being surveyed by both drones, i.e. the most recently surveyed spatial entity 300. This spatial entity would normally be represented by the data entity having the most recent time stamp, since attributes are normally stored or updated for the data entities when the spatial entities are surveyed. If the segment of the spatial model is selected to include the data entity having the most recent time stamp, the segment will thus include the data entity representing the most recently surveyed spatial entity.

In embodiments, a data entity is not created until an attribute 320 has been determined for the spatial entity 300 represented by this data entity. This means that there will be no data entities without attributes 320 in the databases, which means that at start there are no data entities at all in the databases. This may be useful especially if there are large numbers of spatial entities, e.g. due to the resolution being high or the area or volume of the spatial model being large.

In embodiments, snapshots are generated periodically and/or based on the frequency of changes to the data entities. Alternatively, snapshots may be generated only if the time stamps 340 of some of the data entities are older than a snapshot updating time $T_u$, older here referring to the time recorded locally in the database. The determination of synchronization state is preferably performed according to a predictable method or algorithm based on generated and received snapshots such that a synchronization state determined will be the same in all databases in the cluster if the determination is based on identical sets of snapshots. In embodiments, the synchronization state is determined by calculating a checksum based on data entities of the snapshots, where the checksum is generated by merging generated and received data entities, e.g. by applying XOR to a common attribute of the data entities. The synchronization state may be determined in other ways, such as calculating a hash-sum or using an algorithm which calculates a smaller portion of data representing a unique identity of the data entities.

The data entities in each database in the cluster may further be synchronized based on the synchronization state, e.g. according to the rules:

Rule 1. A data entity is always changed as a whole.

Rule 2. Newer versions of data entities replace older.

Rule 3. A predicable selection behavior is needed when data entities and/or snapshots have the same time stamp, e.g. the data entity and/or the snapshot with the highest or lowest VID 330 is selected.

Rule 4. Deleted data entities and/or snapshots always replace none-deleted, even if they are older.

Rule 5. Newer versions of deleted data entities and/or snapshots replace older deleted versions.

In embodiments, all databases in the cluster maintain data using exactly the same rules. Rule 3 may be particularly important if the representation of recorded time is of finite resolution. Rule number 4 may be particularly important to avoid having data entities reappearing after being deleted. Rule number 5 may be particularly important when a timeslot configuration comprising multiple non-overlapping timeslots is used, as deleted entities may otherwise end up in different timeslots. This could cause a situation where the databases falsely seems to be out of sync. Rules 4 and 5 are optional and used only if deleted data entities are handled.

In an exemplary embodiment, the snapshot is generated by merging the set of snapshots and/or data entities into a data structure. The SEPs 310 and/or the attributes 320 and/or the VIDs 330 and/or the time stamps 340 of the data entities may be merged to generate the snapshot. In embodiments, merging data entities to generate a snapshot further comprises applying a logical operator to the data entities, such as exclusive or (XOR), to generate a snapshot in the form of a checksum, e.g. to apply XOR to the VID of the data entities. Other ways of merging the data, such as calculating a hash-sum, may also be used.

The synchronization state is determined by determining that the synchronization state is synchronized if the generated snapshot matches the received snapshots or by determining that the synchronization state is not synchronized if the generated snapshot and the received corresponding snapshots do not all match. One exemplary embodiment of a determined synchronized state is if the data entities on which the generated snapshot is based, and the corresponding data entities stored in the other databases in the cluster, all match, e.g. have identical SEP 310, attributes 320 and time stamp 340, and optionally the same VID 330.

One example of a determined "not synchronized state" is if the data entities on which the generated snapshot is based and the corresponding data entities stored at the other databases in the cluster do not all match, and e.g. any of the SEP 310, attributes 320 and time stamp 340 differ amongst data entities in each database in the cluster. Yet an example of a determined "not synchronized state" is if the data entities on which the generated snapshot is based and the corresponding data entities stored at the other databases in the cluster do not all match, and e.g. any of the SEP 310, attributes 320 and VID 330 differ amongst data entities in each database in the cluster.

In yet an embodiment, the generated snapshots comprise information descriptive of the data entities. In yet an embodiment, the generated snapshots comprise a checksum based on the data entities. In yet an embodiment, the generated snapshots comprise a checksum based on the snapshots. In yet an embodiment, the checksum is based on changes to the data entities. In yet an embodiment, the generated snapshots comprise a checksum based on information comprised in the data entities.

In embodiments, the synchronization state is determined by calculating a checksum based on the data entities in the snapshot, where the checksum is generated by merging generated and received information. The synchronization state may however also be determined in other ways, such as calculating a hash-sum or using an algorithm which calculates a smaller portion of data representing a unique identity of the data entities.

In further embodiments, when a synchronization state is determined that indicates a not synchronized state between the databases in the cluster, e.g. the data entities in each database do not match, a further method step of synchronizing is performed, i.e. a synchronization scheme is initiated. An advantage of basing the generation of a snapshot on information relating to the data entities is that the amount of data exchanged between the databases in the cluster is reduced, which allows a high data update frequency from all databases in the cluster and a reduced bandwidth usage in the communications network.

In one non-limiting example, synchronizing the data entities within same segment of the spatial model in each database comprises exchanging information relating to each data entity in each database between the databases in the cluster in the form of data entities and/or snapshots, generating a missing/changed data entities list, e.g. indicating which data entities the database is missing or has an older version of compared to versions of data entities present at other databases, and distributing it to all other databases in the cluster, receiving missing/changed data entities lists from all other databases in the cluster, generating a data entities send list, sending the latest version of data entities and/or snapshots to databases on the data entities send list, and optionally receiving the latest version of a missing or older version of a data entity from other databases in the cluster. In this way it may be determined that a data entity has not been created and is missing, that the data entity has an older version or that the database is unaware that a data entity has been deleted.

Figure 4:
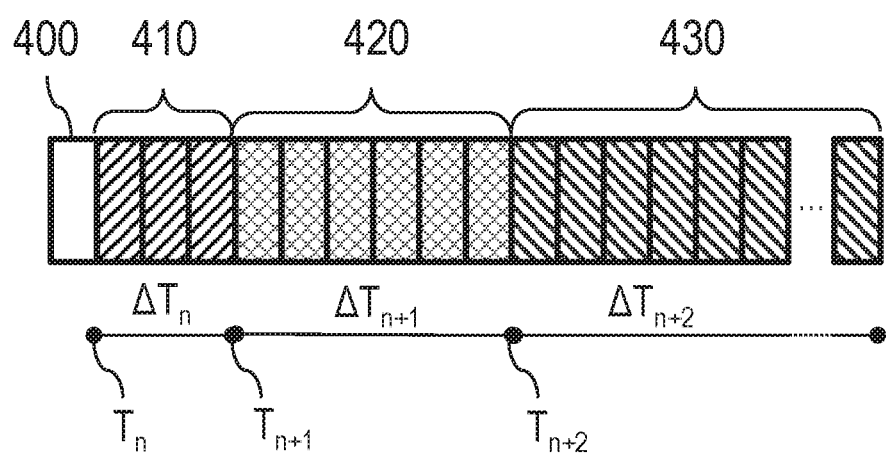
FIG. 4 shows a timeslot configuration, in accordance with one or more embodiments of the disclosure.

The determination of a synchronization state may be simplified if a timeslot configuration is used. FIG. 4 shows a timeslot configuration, in accordance with one or more embodiments of the disclosure. The timeslot configuration may be obtained e.g. as predetermined, determined or retrieved from the storage means 220. The timeslot configuration may comprise a number of timeslots $\Delta T$, each beginning at a start time T, where a stop time can be calculated as start time T+timeslot $\Delta T$.

When the timeslot configuration has been obtained, the data entities to be included in the snapshot may be selected based also on this timeslot configuration, so that only data entities having a time stamp 340 falling within a selected timeslot $\Delta T$ are included in the snapshot.

In embodiments, data entities are continuously obtained, e.g. generated by the database or received from other databases in the cluster, and inserted into a buffer 400 based on the time stamp 340 of each data entity, e.g. in random, ascending or descending order, as the respective data entities are created, updated or deleted. Data entities may then be selected from the buffer 400 based on the timeslot configuration by selecting the data entities that comprise a time stamp 340 that falls within the timeslot $\Delta T$.

The timeslot configuration may e.g. comprise multiple non-overlapping timeslots $\Delta T$. A snapshot may then be generated and received for each of the multiple timeslots $\Delta T$, and a synchronization state may be determined for each of the multiple timeslots $\Delta T$.

In embodiments, the timeslot $\Delta T_{n+1}$ of the following snapshot is doubled in relation to the previous snapshot's timeslot $\Delta T_n$. In a non-limiting example, the multiple non-overlapping timeslots $\Delta T$ in a timeslot configuration comprises a first timeslot $\Delta T_n$, a second timeslot $\Delta T_{n+1}$ and a third timeslot $\Delta T_{n+2}$, where the first timeslot $\Delta T_n$ is two seconds, the second timeslot $\Delta T_{n+1}$ is four seconds and the third timeslot $\Delta T_{n+3}$ is eight seconds.

In embodiments, the timeslot configuration defines and/or comprises multiple non-overlapping timeslots $\Delta T$, each paired with a start time T, e.g. $(\Delta T_n, T_n)$, $(\Delta T_{n+1}, T_{n+1})$ and $(\Delta T_{n+2}, T_{n+2})$, where stop times can be calculated as T+$\Delta T$. In embodiments, non-overlapping timeslots $\Delta T$ are defined with start time and stop time such that the time stamps 340 of selected data entities always fall within one and only one timeslot $\Delta T$. In further embodiments, data entities are selected as multiple selections of data entities, e.g. selection$_n$ 410, selection$_{n+1}$ 420, selection$_{n+2}$ 430, from the buffer based on the timeslot configuration of timeslots $\Delta T$ and the time stamps 340 comprised in the data entities for each timeslot $\Delta T$ comprised in the timeslot configuration. The data entities in each selection may comprise a time stamp 340 that falls within the respective timeslot $\Delta T_n$, $\Delta T_{n+1}$, $\Delta T_{n+2}$. In embodiments, a snapshot is generated based on each of the multiple selections 410, 420, 430 of data entities from the buffer 400.

In embodiments, to further improve the determination of a synchronization state, a synchronization state history can be determined by including multiple non-overlapping timeslots $\Delta T$ comprised in the timeslot configuration and further generating and receiving snapshots for each of the multiple selections of the non-overlapping timeslots $\Delta T$ comprised and/or defined in the timeslot configuration. The snapshots generated by the database for each of the multiple non-overlapping timeslots $\Delta T$ can then be compared to the corresponding snapshots for each of the multiple non-overlapping timeslots $\Delta T$ generated by and/or received from all the other databases in the cluster. In embodiments, the snapshots are compared progressively from the timeslot $\Delta T$ with the start time T nearest to the time recorded in the database, e.g. timeslot $\Delta T_n$, to the timeslot with the start time T furthest from the time recorded in the database, e.g. timeslot $\Delta T_{n+2}$. Thereby the last point in time, represented by the respective snapshot, where the data entities in each database in the cluster were synchronized, can be determined as a synchronization timeslot $\Delta T_s$, and the number of data entities that need to be exchanged between the databases in the cluster can be minimized or at least reduced.

In embodiments, a snapshot is generated by the database and received from each of the other databases in the cluster for each of the multiple non-overlapping timeslots $\Delta T$ comprised and/or defined in the timeslot configuration.

In embodiments, the synchronization procedure optionally starts by determining a synchronization timeslot $\Delta T_s$, e.g. one or multiple timeslots $\Delta T$ defined or comprised in the timeslot configuration. In embodiments, a list of data entities comprising a time stamp 340 that falls within the determined timeslot $\Delta T$ is generated by each database in the cluster. In embodiments, the generated list of data entities is exchanged with all other databases in the cluster, i.e. the database sends the generated list of data entities and receives generated lists of data entities from each database in the cluster. In embodiments, the database compares the received lists of data entities from all other databases in the cluster to the data entities in the database and generates a missing/changed data entities list. In an example, the reason for change to the data entities may be that the data entity was never created at the database, the database had a data entity with an older time stamp 340 or VID 330 or the database was unaware that the data entity had been deleted at one or more of the other databases in the cluster. In embodiments, the missing/changed data entities list is further exchanged with all other databases in the cluster, i.e. the database sends the generated missing/changed data entities list and receives generated missing/changed data entities lists from each database in the cluster. In an example, a database that is missing changes to data entities now has enough information about what it is missing to be capable of creating correct snapshots. The missing/changed data entities list may comprise the data entities themselves, or just the information relating to the data entities.

During a limited time the database can now simulate a synchronized state when generating the snapshot. In embodiments, in an optional method step, the database compares the received missing/changed data entities lists to the data entities in the ordered buffer and generates a data entities send list for one or more databases in the cluster. At this point all participants are aware of what to resend to restore all databases in the cluster to a synchronized state. In embodiments, in an optional method step, each database in the cluster will start sending data entities to one or more databases in the cluster that are comprised in the respective data entities send list. In embodiments, each database will use a random order of the respective data entities send list to reduce the risk of duplicates being sent by multiple databases. In an example, as the sending of data entities from the send list can take a long time to execute, it is desired to be able to detect any new unsynchronized situation simultaneously, which is possible during the correct snapshot simulation. An optional step of removing every data entity received from other databases from the data entities send list may be included, thereby reducing the risk of distributing a data entity twice.

When the timeslot configuration comprises multiple timeslots ΔT, a snapshot may be generated by the database for each of the timeslots ΔT, and be compared to the corresponding snapshots received from all the other databases in the cluster. If the snapshots are compared progressively from the most recent timeslot ΔT, the last timeslot ΔT when the data entities in each database in the cluster were synchronized can be determined. The synchronization timeslot $\Delta T_s$, can then be set to comprise this timeslot ΔT, which means that data entities which have not been changed after the start of this timeslot ΔT do not have to be exchanged. This reduces the number of data entities that need to be exchanged between the databases in the cluster, and thus also reduces the bandwidth used for the synchronization.

The synchronization may take place with or without a timeslot configuration. In embodiments, the method however further comprises an optional determination of a synchronization timeslot $\Delta T_s$.

In embodiments, the synchronization timeslot $\Delta T_s$ comprises one or more consecutive timeslots ΔT from the timeslot configuration. In an example, snapshots for multiple timeslots ΔT defined or comprised in the timeslot configuration are generated at each database, exchanged and compared to determine the timeslot ΔT or time period for which the databases in the cluster are not synchronized, e.g. the snapshot from each database do not match for one or more consecutive timeslots ΔT. In yet an example, the synchronization timeslot $\Delta T_s$ is defined by five consecutive timeslots ΔT in a timeslot configuration. The determined synchronization state for snapshots within timeslots $\Delta T_3$-$\Delta T_5$ indicates a synchronized state and the determined synchronization state for snapshots within timeslots $\Delta T_1$-$\Delta T_2$ indicates a non-synchronized state. The synchronization timeslot $\Delta T_s$ may then be determined by merging timeslots $\Delta T_1$-$\Delta T_2$, thus eliminating the need to exchange snapshots and/or data entities and/or checksums with a time stamp 340 falling within timeslots $\Delta T_3$-$\Delta T_5$.

Method Embodiments

Figure 5:
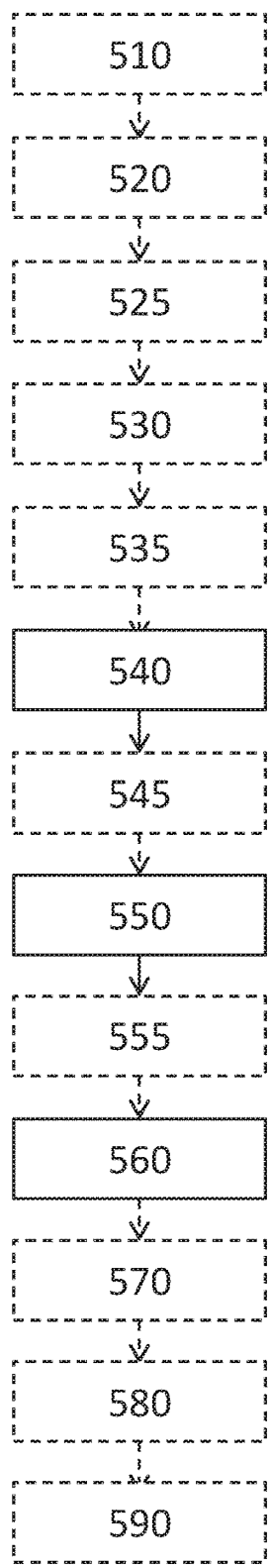
FIG. 5 shows a flow diagram for a method for determining a synchronization state between databases in a distributed and nonhierarchical database cluster, in accordance with one or more embodiments of the disclosure.

FIG. 5 shows a flow diagram for a method 500 for determining a synchronization state between databases in a distributed and nonhierarchical database cluster. The method may preferably be used to determine a synchronization state between a primary database and one or more secondary databases communicatively coupled with the primary database to form a distributed and nonhierarchical database cluster, wherein the primary and secondary databases store attributes of spatial entities of a space modeled using a spatial model, and each database comprises data entities representing spatial entities with defined spatial boundaries within at least a segment of the spatial model, where the attributes of the spatial entities are coupled to the data entities.

In accordance with one or more embodiments of the disclosure, the method comprises the following steps:

Step 540: generating a snapshot comprising information relating to data entities within a first segment of the spatial model in the primary database at a snapshot time $T_s$, said information identifying changes to the data entities where each change comprises a time stamp 340, wherein only data entities with a time stamp $\leq T_0$, where $T_s > T_0$, are included in the snapshot, although changes to the data entities up to the time $T_s$ have been received and stored in the primary database.

Step 550: receiving, from one or more secondary databases in the cluster, corresponding generated snapshots, each snapshot comprising data entities within the same first segment of the spatial model in the secondary database, wherein only data entities with a time stamp $\leq T_0$, where $T_s > T_0$, are included in the snapshot.

Step 560: determining a synchronization state based on a comparison between the generated and received snapshots, wherein the synchronization state is determined to be not synchronized if the generated snapshot and the received corresponding snapshots do not all match.

In embodiments, the data entities are not created until at least one attribute 320 has been determined for the spatial entity 300 represented by the respective data entity. This means that there will be no data entities without attributes 320 in the databases, which means that at start there are no data entities at all in the databases. This may be useful especially if there are large numbers of spatial entities, e.g. due to the resolution being high or the area or volume of the spatial model being large.

In embodiments, the space has been modeled using a hierarchical spatial model, such as e.g. a hierarchical hexagonal model, a hierarchical quadtree model or a hierarchical octree model.

In embodiments, the method further comprises one or more of the following steps:

Step 510: determining $T_0$ in such a way that it for the selected snapshot time $T_s$ represents a corresponding time in all databases.

Step 520: selecting the snapshot time $T_s$ to be at least a delay time $T_d$ after $T_0$, i.e. $T_s \geq T_0 + T_d$.

Step 525: setting the delay time $T_d$ to be longer than the maximum transmission delay time between the databases in the cluster.

Step 530: selecting the first segment of the spatial model based on the SEP 310 of the data entity having the most recent time stamp 340. The size of the segment may be selected e.g. based on the transmission conditions, in order to reduce the amount of data needed to be transferred if the transmission conditions are bad. The segment may be selected to be the whole spatial model, but it is generally more practical to select a limited area or volume.

Step 535: obtaining a timeslot configuration, and selecting the data entities to be included in the snapshot based also on the timeslot configuration, so that only data entities having a time stamp 340 falling within a selected timeslot ΔT are included in the snapshot. The timeslot configuration may e.g. comprise multiple non-overlapping timeslots ΔT, where a snapshot is generated and received for each of the multiple timeslots ΔT, and a synchronization state is determined for each of the multiple timeslots ΔT.

Step 545: generating the snapshot based on there being determined to be a need to synchronize the primary database with at least one secondary database. This may e.g. be based on the proximity between two database arrangements 200.

Step 555: selecting the secondary databases from which to receive snapshots based on the selected first segment of the spatial model. The number of other databases to exchange snapshots with may be selected based e.g. on the size of the segment selected and/or the nature of the attributes 320. If a very small segment is selected, it may not be interesting to synchronize this segment with all the other databases in the cluster. Also, if the attributes 320 are fast-changing, attributes 320 stored a long time ago in other databases may be less interesting to synchronize. The other databases to exchange snapshots with may however be determined simply based on which other databases are within communicating range. There is often not a need to synchronize all of the data entities in all of the databases in the cluster.

Step 570: determining the synchronization state by calculating a checksum based on the data entities in the snapshot, where the checksum is generated by merging generated and received information.

Step 580: synchronizing the data entities in the primary database with the data entities in the at least one secondary database if the synchronization state is determined to be not synchronized.

Step 590: maintaining a simulated synchronized state during the synchronization.

Other Embodiments

The at least one processor 210 of the described database arrangement 200 is in accordance with one or more embodiments configured to perform a selection of any or all of the method steps described herein that are associated with synchronizing databases.

In one or more embodiments, there is provided a computer-readable medium on which is stored:
non-transitory information for performing a method according to any of the embodiments described herein;
and/or
non-transitory information configured to control a processor to perform any of the steps or functions of embodiments described herein.

In one or more embodiments, there is provided a computer program product comprising code portions adapted to control a processor to perform any of the steps or functions of any of the embodiments described herein. Software in accordance with the present disclosure, such as program code portions and/or data, can be stored in non-transitory form on one or more machine-readable mediums. It is also contemplated that software identified herein can be implemented using one or more general purpose or specific purpose computers and/or computer systems, networked and/or otherwise.

Where applicable, one or more embodiments provided by the present disclosure can be implemented using hardware, software, or combinations of hardware and software. Also where applicable, the various hardware components and/or software components set forth herein can be combined into composite components comprising software, hardware, and/or both. Where applicable, the various hardware components and/or software components set forth herein can be separated into sub-components comprising software, hardware, or both. In addition, where applicable, it is contemplated that software components can be implemented as hardware components, and vice-versa. Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Accordingly, the scope of the invention is defined only by the claims.

Further, not all of the steps of the claims have to be carried out in the listed order. All technically meaningful orders of the steps are covered by the claims.

The invention claimed is:

1. A method for determining a synchronization state between a primary database and one or more secondary databases communicatively coupled with the primary database to form a distributed and nonhierarchical database cluster, wherein the primary and secondary databases store attributes of spatial entities of a space modeled using a spatial model, and each database comprises data entities representing spatial entities with defined spatial boundaries within at least a segment of the spatial model, where the attributes of the spatial entities are coupled to the data entities, the method comprising:
generating a snapshot comprising information relating to data entities within a first segment of the spatial model in the primary database at a snapshot time $T_s$, said information identifying changes to the data entities where each change comprises a time stamp, wherein only data entities with a time stamp $\leq T_0$, where $T_s > T_0$, are included in the snapshot, although changes to the data entities up to the time $T_s$ have been received and stored in the primary database;
receiving, from one or more secondary databases in the cluster, corresponding generated snapshots, each snapshot comprising data entities within the same first segment of the spatial model in said secondary database, wherein only data entities with a time stamp $\leq T_0$, where $T_s > T_0$, are included in the snapshot; and
determining a synchronization state based on a comparison between the generated and received snapshots, wherein the synchronization state is determined to be not synchronized if the generated snapshot and the received corresponding snapshots do not all match.

2. The method of claim 1, further comprising selecting the snapshot time $T_s$ to be at least a delay time $T_d$ after $T_0$, i.e. $T_s \geq T_0 + T_d$.

3. The method of claim 2, further comprising setting the delay time $T_d$ to be longer than the maximum transmission delay time between the databases in the cluster.

4. The method of claim 1, further comprising determining $T_0$ in such a way that it for the selected snapshot time $T_s$ represents a corresponding time in all databases.

5. The method of claim 1, further comprising selecting the first segment of the spatial model based on the spatial entity position of the data entity having the most recent time stamp.

6. The method of claim 1, further comprising selecting the secondary databases from which to receive snapshots based on the selected first segment of the spatial model.

7. The method of claim 1, further comprising generating the snapshot based on there being determined to be a need to synchronize the primary database with at least one secondary database.

8. The method of claim 1, wherein a data entity is not created in the primary database until an attribute has been determined for the spatial entity represented by this data entity.

9. The method of claim 1, wherein the space has been modeled using a hierarchical spatial model, such as e.g. a hierarchical hexagonal model, a hierarchical quadtree model or a hierarchical octree model.

10. The method of claim 1, further comprising obtaining a timeslot configuration, and selecting the data entities to be included in the snapshot based also on said timeslot configuration, so that only data entities having a time stamp falling within a selected timeslot are included in the snapshot.

11. The method of claim 10, wherein the timeslot configuration comprises multiple non-overlapping timeslots, where a snapshot is generated and received for each of the multiple timeslots, and a synchronization state is determined for each of the multiple timeslots.

12. The method of claim 1, further comprising determining the synchronization state by calculating a checksum based on the data entities in the snapshot, where the checksum is generated by merging generated and received information.

13. The method of claim 1, further comprising synchronizing the data entities in the primary database with the data entities in the at least one secondary database if the synchronization state is determined to be not synchronized.

14. The method of claim 13, further comprising maintaining a simulated synchronized state during the synchronization.

15. A primary database arrangement in a distributed and nonhierarchical cluster of communicatively coupled database arrangements, the primary database arrangement comprising a primary database storing attributes of spatial entities of a space modeled using a spatial model, and comprising data entities representing spatial entities with defined spatial boundaries within at least a segment of the spatial model, where the attributes of the spatial entities are coupled to the data entities, wherein the primary database arrangement further comprises:
- at least one processor configured to perform the method steps of claim 1;
- a storage means configured to store the data entities and their attributes; and
- a communications interface configured to send/receive attributes related to the data entities to/from the processor to/from one or more secondary database arrangements in the cluster.

16. A computer-readable medium on which is stored non-transitory information configured to control a processor to perform the method steps of claim 1.

17. A computer program product comprising code portions adapted to control a processor to perform the method steps claim 1.

* * * * *